US009231893B2

(12) United States Patent
Lin et al.

(10) Patent No.: US 9,231,893 B2
(45) Date of Patent: Jan. 5, 2016

(54) PROCESSING CIRCUITS OF TELECOMMUNICATIONS DEVICES AND RELATED METHODS

(71) Applicant: MEDIATEK INC., Hsin-Chu (TW)

(72) Inventors: Kai-Li Lin, Hsinchu County (TW); Ming-Chih Hu, Hsinchu County (TW); Ming-Wei Lai, Hsinchu County (TW)

(73) Assignee: MEDIATEK INC., Science-Based Industrial Park, Hsin-Chu (TW)

( * ) Notice: Subject to any disclaimer, the term of this patent is extended or adjusted under 35 U.S.C. 154(b) by 98 days.

(21) Appl. No.: 13/894,434

(22) Filed: May 15, 2013

(65) Prior Publication Data
US 2014/0341233 A1    Nov. 20, 2014

(51) Int. Cl.
*H04L 29/06* (2006.01)
*H04L 12/861* (2013.01)
*H04J 3/24* (2006.01)

(52) U.S. Cl.
CPC ..................................... *H04L 49/90* (2013.01)

(58) Field of Classification Search
CPC .................. H04Q 11/0478; H04L 2012/5652; H04L 29/0653; H04L 47/10; H04L 29/06
USPC .......................................................... 370/474
See application file for complete search history.

(56) References Cited

U.S. PATENT DOCUMENTS

| | | | | |
|---|---|---|---|---|
| 5,691,819 A | * | 11/1997 | Uchida et al. | 386/208 |
| 5,913,012 A | * | 6/1999 | Nam | 386/207 |
| 6,356,528 B1 | * | 3/2002 | Lundby et al. | 370/209 |
| 6,611,624 B1 | * | 8/2003 | Zhang et al. | 382/232 |
| 8,738,981 B2 | * | 5/2014 | Gorokhov et al. | 714/749 |
| 2010/0246604 A1 | * | 9/2010 | Kim et al. | 370/474 |
| 2010/0303016 A1 | * | 12/2010 | Jin et al. | 370/328 |
| 2011/0055667 A1 | * | 3/2011 | Wang et al. | 714/780 |

* cited by examiner

*Primary Examiner* — Mark Rinehart
*Assistant Examiner* — Sanjay K Dewan
(74) *Attorney, Agent, or Firm* — Winston Hsu; Scott Margo

(57) ABSTRACT

An embodiment of the invention provides a processing circuit of a telecommunications device. The processing circuit includes a pre-buffer, a de-shuffler, and a processing module. The pre-buffer is configured to receive and buffer a plurality of sets of data of a transport block in a shuffled order. The sets of data correspond to a plurality of code blocks, respectively. The de-shuffler is coupled to the pre-buffer and is configured to retrieve the sets of data from the pre-buffer in a de-shuffled order. The de-shuffled order is different from the shuffled order. The processing module is coupled to the de-shuffler and is configured to receive the sets of data from the de-shuffler in the de-shuffled order to recover the code blocks.

18 Claims, 6 Drawing Sheets

PROCESSING CIRCUITS OF TELECOMMUNICATIONS DEVICES AND RELATED METHODS

BACKGROUND

1. Technical Field

The invention relates generally to telecommunications, and more particularly, to processing circuits of telecommunications devices and related methods.

2. Related Art

A telecommunications device may use a processing circuit to process the data received from another telecommunications device. If the received data is shuffled and the processing circuit needs to handle several stages of processing, the processing circuit may need to have several large buffers to temporally store several intermediary versions of the shuffled data. The sizes of the buffers critically affect the overall costs of the processing circuit.

Apparently, processing circuits with smaller buffers, or no buffer at all, may help make telecommunications devices more affordable.

SUMMARY

An embodiment of the invention provides a processing circuit of a telecommunications device. The processing circuit includes a pre-buffer, a de-shuffler, and a processing module. The pre-buffer is configured to receive and buffer a plurality of sets of data of a transport block in a shuffled order. The sets of data correspond to a plurality of code blocks, respectively. The de-shuffler is coupled to the pre-buffer and is configured to retrieve the sets of data from the pre-buffer in a de-shuffled order. The de-shuffled order is different from the shuffled order. The processing module is coupled to the de-shuffler and is configured to receive the sets of data from the de-shuffler in the de-shuffled order to recover the code blocks.

Another embodiment of the invention provides a processing circuit of a telecommunications device. The processing circuit includes a pre-buffer, a de-shuffler, a first processing chain, a second processing chain, and a concatenation unit. The pre-buffer is configured to receive and buffer a plurality of sets of data of a transport block in a shuffled order. The sets of data correspond to a plurality of code blocks, respectively. Each of the sets of data includes a set of system bit data and a set of parity bit data. The de-shuffler is coupled to the pre-buffer and is configured to retrieve the sets of system bit data from the pre-buffer in a de-shuffled order and retrieve the sets of parity bit data from the pre-buffer in the de-shuffled order. The de-shuffled order is different from the shuffled order. The first processing chain is coupled to the de-shuffler and is configured to receive the sets of system bit data from the de-shuffler in the de-shuffled order to recover a plurality of system bit sections. The second processing chain is coupled to the de-shuffler and is configured to receive the sets of parity bit data from the de-shuffler in the de-shuffled order to recover a plurality of parity bit sections. The concatenation unit is coupled to the first processing chain and the second processing chain and is configured to combine each of the system bit sections with a corresponding one of the parity bit sections to form a corresponding one of the code blocks.

Still another embodiment of the invention provides a method performed by a telecommunications device. First, the telecommunications device receives and buffers a plurality of sets of data of a transport block in a shuffled order. Then, the telecommunications device processes the sets of data of the transport block in a de-shuffled order to recover a plurality of code blocks. The de-shuffled order is different from the shuffled order. The code blocks correspond to the sets of data of the transport block, respectively.

Other features of the present invention will be apparent from the accompanying drawings and from the detailed description which follows.

BRIEF DESCRIPTION OF THE DRAWINGS

The invention is fully illustrated by the subsequent detailed description and the accompanying drawings, in which like references indicate similar elements.

DETAILED DESCRIPTION

Figure 1:
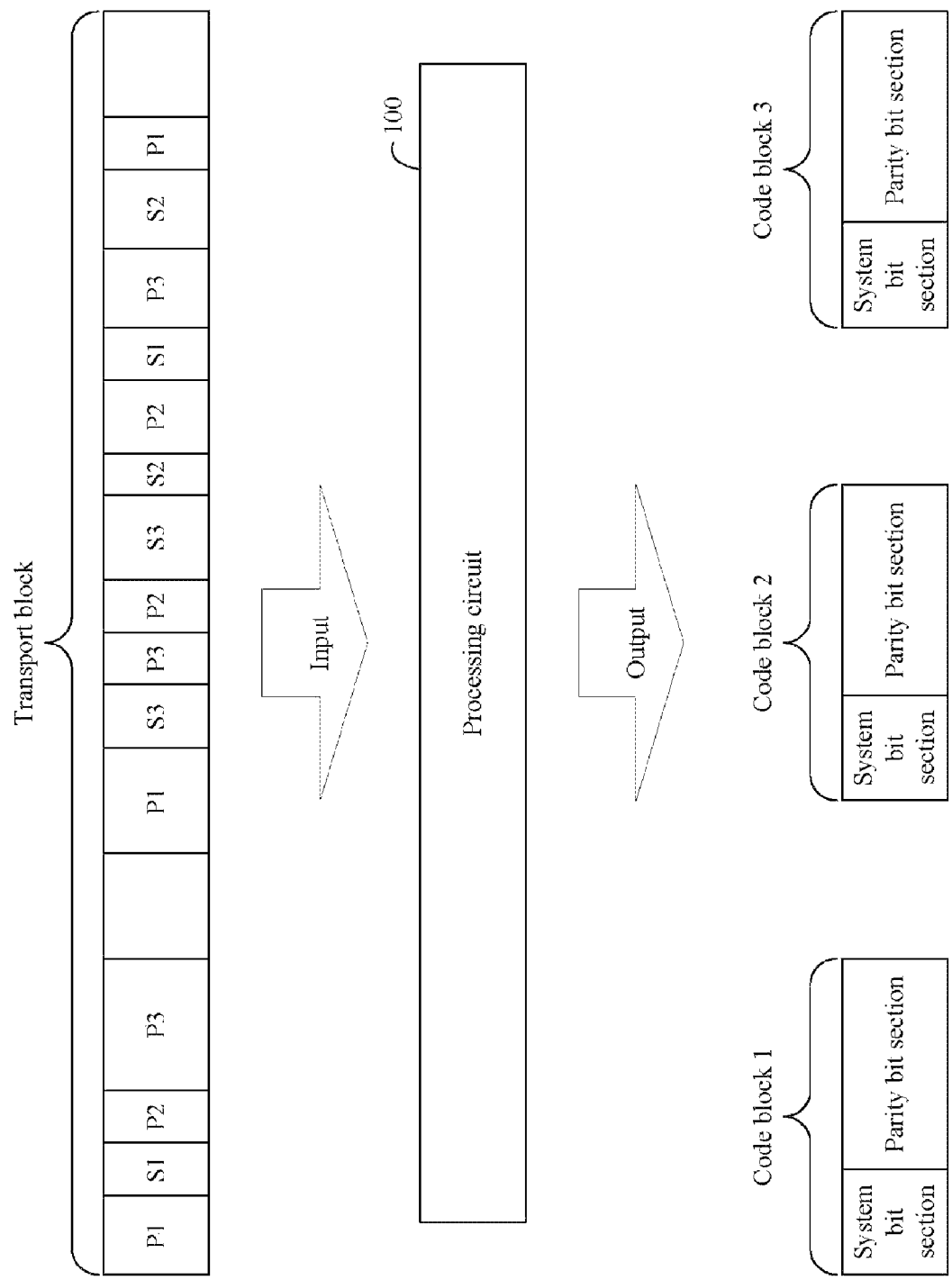
FIG. 1 is a simplified schematic diagram showing a processing circuit of an embodiment of the invention processes a transport block to generate several code blocks.

FIG. 1 is a simplified schematic diagram showing a processing circuit of an embodiment of the invention processes a transport block to generate several code blocks. The processing circuit 100 may be a part of a telecommunications device, and may be coupled to a radio frequency (RF) circuit and a decoder of the telecommunications device. The RF circuit may provide soft-bits of the transport block to the processing circuit 100. The processing circuit 100 may process the transport block to recover hard-bits of the code blocks, and then pass the code blocks to the decoder. For example, the telecommunications device may be a wideband code division multiple access (WCDMA) telecommunications device, such as a WCDMA Node B or a WCDMA user equipment (UE). The decoder may be a forward error correction (FEC) decoder. In other words, the code blocks that the processing circuit 100 recovers may be FEC code blocks to be decoded. The decoder may perform decoding such as turbo decoding, Viterbi decoding, low density parity check (LDPC) decoding, or Reed-Solomon (RS) decoding.

The transport block that the processing circuit 100 receives includes a plurality of sets of data arranged in a shuffled order. The processing circuit 100 may use each of the sets of data to recover a code block, which may then be passed to the subsequent decoder. In the simplified example shown in FIG. 1, the transport block includes three sets of data in a shuffled order. A first set of data includes a set of system bit data represented by rectangles labeled as "S1" and a set of parity bit data represented by rectangles labeled as "P1." These sets of system bit data and parity bit data may be processed to recover the system bit section and the parity bit section of code block 1, respectively. A second set of data includes a set of system bit data represented by rectangles labeled as "S2" and a set of parity bit data represented by rectangles labeled as "P2." These sets of system bit data and parity bit data may be processed to recover the system bit section and the parity bit section of code block 2, respectively. A third set of data includes a set of system bit data represented by rectangles labeled as "S3" and a set of parity bit data represented by rectangles labeled as "P3." These sets of system bit data and parity bit data may be processed to recover the system bit section and the parity bit section of code block 3, respectively. Other not labeled rectangles in the transport block may represent other sections, such as cyclic redundancy check (CRC) sections, of the transport block. The data in the transport block is shuffled because different sets of data are intertwined with each other.

Figure 2:
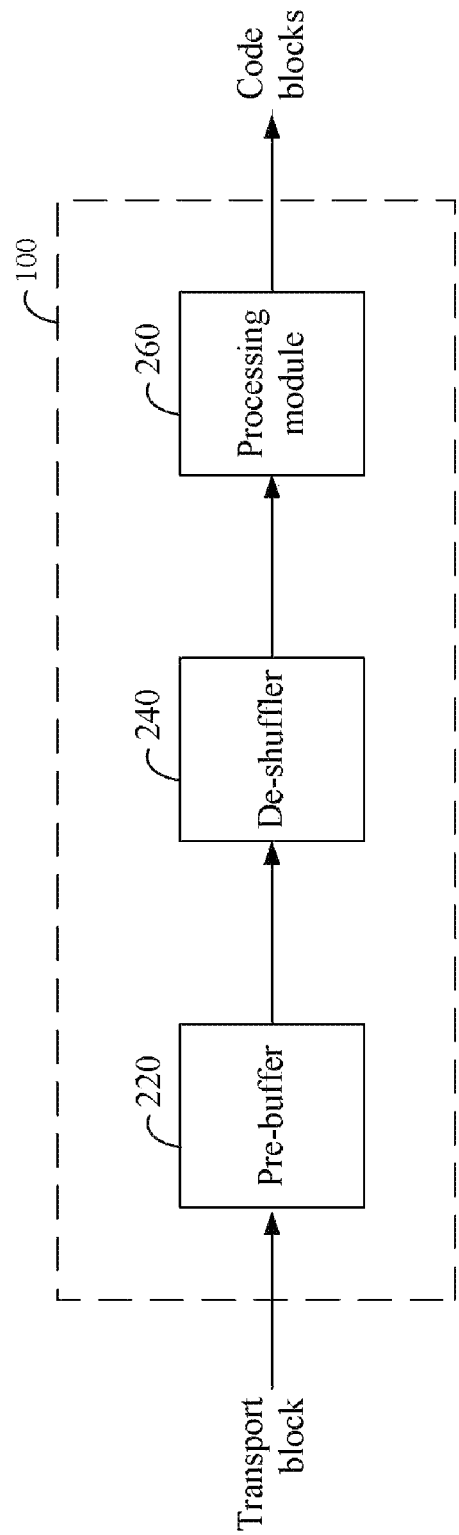
FIG. 2 shows a simplified block diagram of the processing circuit of FIG. 1 according to an embodiment of the invention.

FIG. 2 shows a simplified block diagram of the processing circuit of FIG. 1 according to an embodiment of the invention. The processing circuit 100 of this embodiment includes a pre-buffer 220, a de-shuffler 240, and a processing module 260. Because the decoder subsequent to the processing circuit 100 may need to receive code blocks in a de-shuffled order (e.g. code block 1 first, then code block 2, then code block 3) the processing circuit 100 needs to generate the code blocks in the de-shuffled order even though the transport blocks contains the sets of data in the shuffled order. The de-shuffled order is different from the shuffled order.

Simply speaking, the pre-buffer 220 first receives and buffers the sets of data of the transport block in the shuffled order. Then, the de-shuffler 240 retrieves the sets of data of the transport block and provides the sets of data to the processing module 260 in the de-shuffled order. Next, the processing module 260 processes the sets of data in the de-shuffled order to recover the code blocks. The code blocks are then passed to the subsequent decoder.

As mentioned, the pre-buffer 220 receives and buffers the sets of data in the shuffled order. Using the transport block depicted in FIG. 1 as an example, the pre-buffer 220 receives and buffers the data on the left end the earliest and the data on the right end the latest. This is a shuffled order because the pre-buffer 220 does not receive the sets of data one set after another. In other words, the pre-buffer 220 does not receive all content of the first set of data the earliest, all content of the second set of data then, and all content of the third set of data next. Instead, these sets of data are intertwined with each other.

Although the pre-buffer 220 receives and buffers the sets of data in the shuffled order, the de-shuffler 240 retrieves the sets of data from the pre-buffer 200 in the de-shuffled order. Using the transport block depicted in FIG. 1 as an example, the de-shuffler 240 first retrieves from the pre-buffer 220 and passes to the processing module 260 the set of data labeled as S1 and P1, then retrieves from the pre-buffer 220 and passes to the processing module 260 the set of data labeled as S2 and P2, and then retrieves from the pre-buffer 220 and passes to the processing module 260 the set of data labeled as S3 and P3.

Because the processing module 260 receives the sets of data in the de-shuffled order, it may process the sets of data in the de-shuffled order rather than in the shuffled order. Specifically, the processing module 260 may act in a first-come-first-processed manner. In contrast, if the processing module 260 received the sets of data in the shuffled order, it would not be able to act in the first-come-first-process manner. Instead, the processing module 260 would need to have a large mid-buffer (which would increase the overall costs) to store an intermediary version of the whole transport block. The intermediary version contains enough information for recovering all the code blocks of the transport block.

The processing module 260 may need to handle multiple stages of processing. For example, these stages may include de-rate-matching, de-quadrature amplitude modulation (de-QAM), de-interleaving, hybrid automatic repeat request (HARQ) combining, de-scrambling, etc. The processing module 260 of this embodiment performs each of the stages in the de-shuffled order. The processing stages performed prior to HARQ combination may be collectively referred to as pre-processing; a unit configured to handle pre-processing may be referred to as a pre-processing unit. For example, pre-processing may include de-rate-matching, de-QAM, and de-interleaving. The processing stages performed subsequent to HARQ combination may be collectively referred to as post-processing; a unit configured to handle post-processing may be referred to as a post-processing unit. For example, post-processing may include de-rate-matching and de-scrambling.

Under the above-mentioned trichotomy, the processing module 260 may need to include a pre-processing unit, a HARQ combination unit, and a post-processing unit. Aside from these components, the processing module 260 includes no mid-buffer that's large enough to store an intermediary version of the whole transport block. In contrast, if the processing module 260 received the sets of data in the shuffled order, it would need to include a mid-buffer, e.g. a static random access memory (SRAM) subsequent to the HARQ combination unit, that's large enough to store an intermediary version of the whole transport block.

Figure 3:
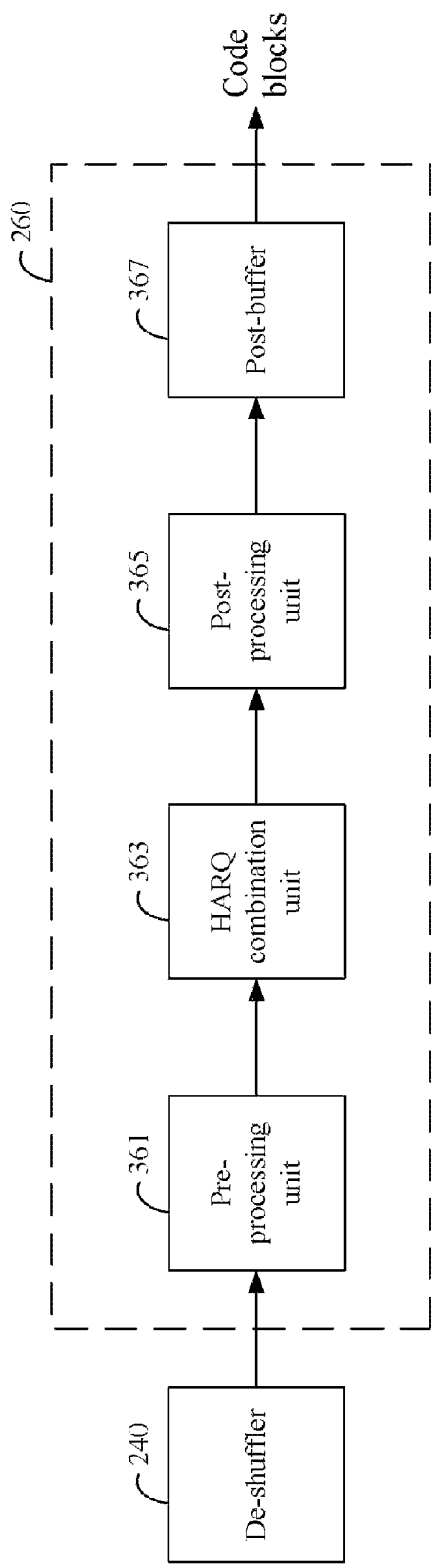
FIG. 3 shows a simplified block diagram of a processing module of FIG. 2 according to an embodiment of the invention.

FIG. 3 shows a simplified block diagram of the processing module of FIG. 2 according to an embodiment of the invention. The processing module 260 of this embodiment includes a pre-processing unit 361, a HARQ combination unit 363, a post-processing unit 365, and a post-buffer 367. The pre-processing unit 361 performs stages of pre-processing in the de-shuffled order. The post-processing unit 365 performs stages of post-processing in the de-shuffled order. Lying between the pre-processing unit 361 and the post-processing unit 365, the HARQ combination unit 363 performs HARQ combination whenever it's necessary. It may be bypassed whenever HARQ combination is not needed. Specifically, when the processing module 260 is not confident enough as to whether a section of data is correct or not, the HARQ combination unit 363 may output the section of data to an external memory. Then, after receiving a re-transmitted version of the data section, the HARQ combination unit 363 may retrieve the old version from the external memory, and then combine the old version with the re-transmitted version to generate a renewed version of the data section. The HARQ combination unit 363 may again output the renewed version of the data section to the external memory if it's still uncertain as to whether the renewed data section is correct or not. For example, the external memory may be dynamic random access memory (DRAM), and the HARQ combination unit 363 may interact with the DRAM through a read/write buffer and an external memory interface (EMI).

The post-buffer 367 is subsequent to the post-processing unit 365. Each time the post-buffer 367 receives and stores a pair of system bit section and parity bit section of a code block, the subsequent decoder may then retrieve the code block from the post-buffer 367 to perform FEC decoding. This post-buffer 367 may be an SRAM that's large enough to store one or two code blocks.

Figure 4:
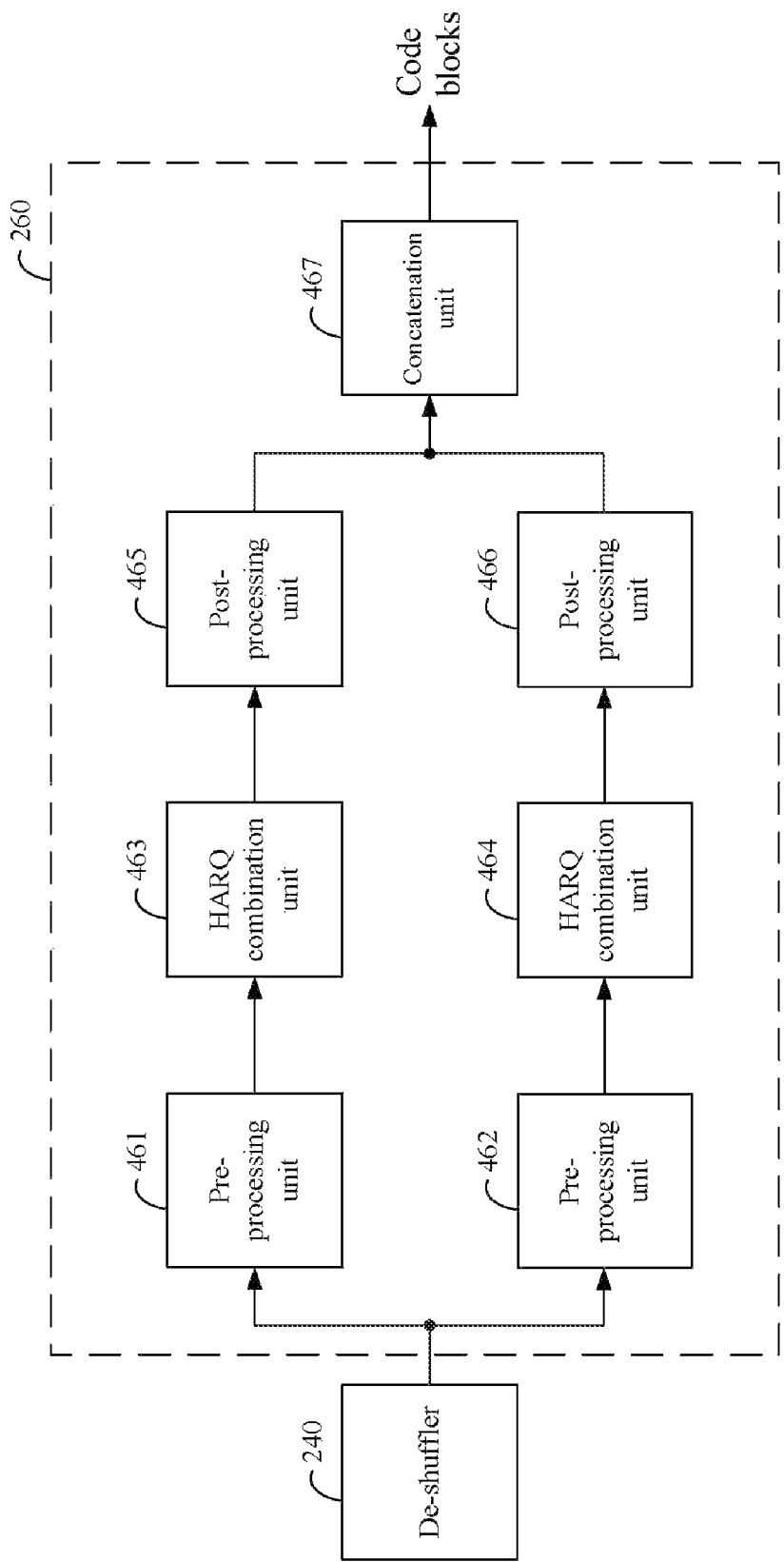
FIG. 4 shows a simplified block diagram of the processing module of FIG. 2 according to another embodiment of the invention.

FIG. 4 shows a simplified block diagram of the processing module of FIG. 2 according to another embodiment of the invention. The processing module 260 of this embodiment includes a pre-processing unit 461, a HARQ combination unit 463, a post-processing unit 465, a pre-processing unit 462, a HARQ combination unit 464, a post-processing unit 466, and a concatenation unit 467.

The pre-processing unit 461, the HARQ combination unit 463, and the post-processing unit 465 as a whole may be referred to as a first processing chain. These components are similar to the pre-processing unit 361, the HARQ combination unit 363, and the post-processing unit 365 of FIG. 3, except for that the units 461, 463, and 465 handle system bit related data (but not parity bit related data) to recover system bit sections in the de-shuffled order. The pre-processing unit 462, the HARQ combination unit 464, and the post-processing unit 466 as a whole may be referred to as a second processing chain. These components are similar to the pre-processing unit 361, the HARQ combination unit 363, and the post-processing unit 365 of FIG. 3, except for that the units 462, 464, and 466 handle parity bit related data (but not system bit related data) to recover parity bit sections in the de-shuffled order.

To work with the two processing chains, the de-shuffler 240 of FIG. 4 retrieves from the pre-buffer 220 and passes to the first processing chain the sets of system bit data in the de-shuffled order. In the meantime, the de-shuffler 240 of FIG. 4 retrieves from the pre-buffer 220 and passes to the second processing chain the sets of parity bit data in the de-shuffled order. Using the transport block depicted in FIG. 1 as an example, the de-shuffler 240 first retrieves the first set of system bit data (labeled as S1) for the first processing chain and the first set of parity bit data (labeled as P1) for the second processing chain. Then, the de-shuffler 240 retrieves the second set of system bit data (labeled as S2) for the first processing chain and the second set of parity bit data (labeled as P2) for the second processing chain. Next, the de-shuffler 240 retrieves the third set of system bit data (labeled as S3) for the first processing chain and the third set of parity bit data (labeled as P3) for the second processing chain.

After receiving a pair of system bit section and parity bit section of a code block from the first and second processing chain, the concatenation unit 467 combines the two sections to form a code block, and then passes the code block to the subsequent decoder. There may be an optional post-buffer serving as an intermediary unit between the concatenation unit 467 and the subsequent decoder. This intermediary buffer may be an SRAM that's large enough to store one or two code blocks.

Figure 5:
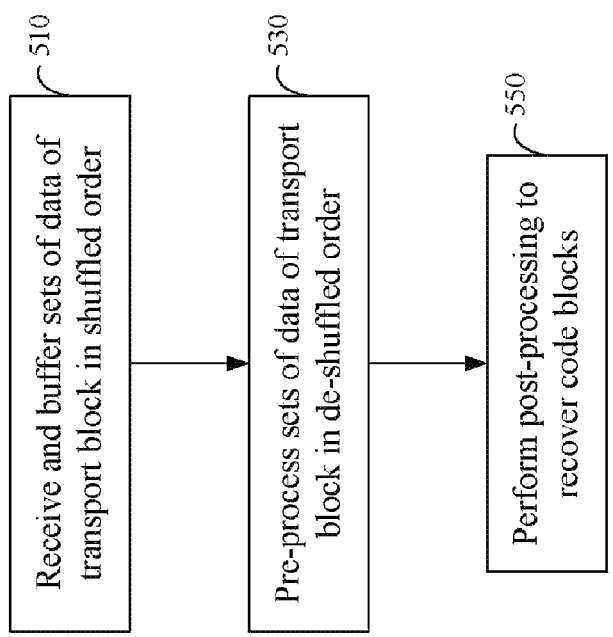
FIG. 5 shows a simplified flowchart of a method the processing circuit of FIG. 1 performs according to an embodiment of the invention.

FIG. 5 shows a simplified flowchart of a method the processing circuit of FIG. 1 performs according to an embodiment of the invention. At step 510, the processing circuit 100 receives and buffers the sets of data of the transport block in the shuffled order. At step 530 and step 550, the processing circuit 100 processes the sets of data in the de-shuffled order to recover the code blocks corresponding to the sets of data. Specifically, the processing circuit 100 pre-processes the sets of data in the de-shuffled order at step 530, and performs post-processing to recover the code blocks at step 550. Subsequent to step 550, the decoder of the telecommunications device decodes the code blocks.

Figure 6:
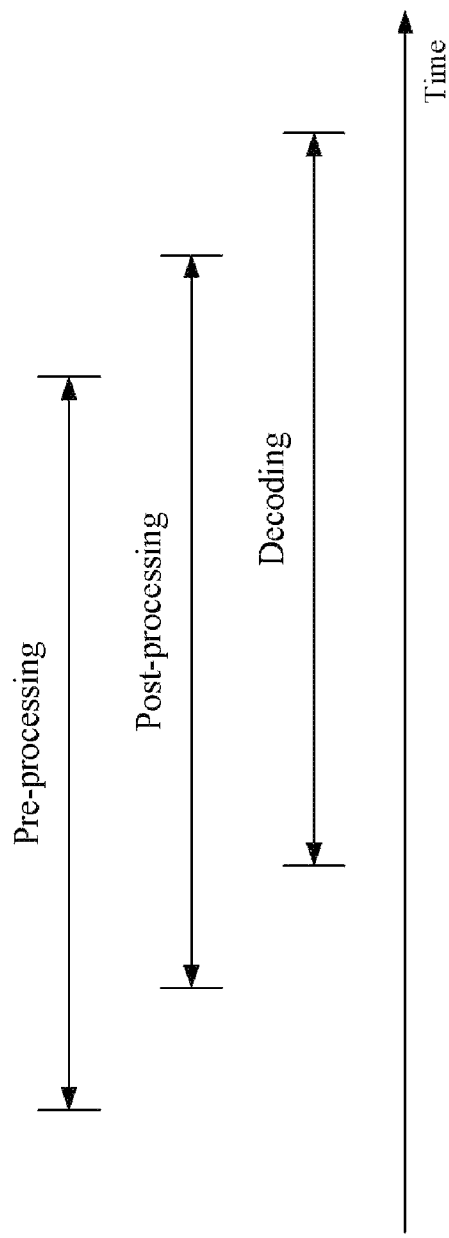
FIG. 6 shows a timing diagram illustrating the timing relationship between the pre-processing, post-processing, and decoding steps performed for a transport block.

FIG. 6 shows a timing diagram illustrating the timing relationship between the pre-processing, post-processing, and decoding steps performed for the transport block. Because the processing circuit 100 processes the sets of data of the transport block in the de-shuffled order, the pre-processing, post-processing, and decoding steps may substantially overlap with each other in time. Using FIG. 1 as an example, the processing circuit 100 may start the post-processing step to recover code block 1 immediately or soon after the first set of data (labeled as S1 and P1 in FIG. 1) is completely pre-processed. This means that the post-processing step may be started before the last set of data (labeled as S3 and P3 in FIG. 1) has been completely pre-processed. Similarly, the decoder subsequent to the processing circuit 100 may start the decoding step to decode code block 1 immediately or soon after the code block 1 has been recovered. As a result, the decoding step may be started before the last set of data has been completely pre-processed.

The characteristics mentioned in the previous paragraph may help reduce the delay time in recovering all the code blocks of the transport block. In contrast, if the processing circuit 100 received the sets of data in the shuffled order, it might start post-processing only after the whole transport block has been pre-processed. In other words, pre-processing and post-processing of the same transport block would not overlap in time, causing the processing delay to be relatively longer.

The aforementioned embodiments have several advantages. For example, aside from the pre-buffer 220, the processing circuit 100 needs not to have a mid-buffer that's large enough to store the intermediary version of a whole transport block. Without this large mid-buffer (which may be an SRAM), the overall costs of the processing circuit 100 may be reduced greatly. This may help make the telecommunications device more affordable. In addition, the embodiments may help reduce delay time in processing and decoding each transport block.

In the foregoing detailed description, the invention has been described with reference to specific exemplary embodiments thereof. It will be evident that various modifications may be made thereto without departing from the spirit and scope of the invention as set forth in the following claims. The detailed description and drawings are, accordingly, to be regarded in an illustrative sense rather than a restrictive sense.

What is claimed is:

1. A processing circuit of a telecommunications device, comprising:
    a pre-buffer, configured to receive and buffer a plurality of sets of data of a transport block in a shuffled order, wherein the sets of data correspond to a plurality of code blocks, respectively, and each of the sets of data comprises a set of system bit data and a set of parity bit data, the set of system bit data and the set of parity bit data in the transport block being intertwined with another sets of system bit data and parity bit data;
    a de-shuffler, coupled to the pre-buffer, configured to retrieve the sets of data from the pre-buffer in a de-shuffled order, wherein the de-shuffled order is different from the shuffled order; and
    a processing module, coupled to the de-shuffler, configured to receive the sets of data from the de-shuffler in the de-shuffled order to recover the code blocks, wherein a set of system bit data and a set of parity bit data in the recovered code blocks are not intertwined with another sets of system bit data and parity bit data.

2. The processing circuit of claim 1, wherein the processing module is configured to act in a first-in-first-processed manner.

3. The processing circuit of claim 1, wherein the processing module comprises:
    a pre-processing unit, coupled to the de-shuffler;
    a HARQ combination unit, coupled to the pre-processing unit;
    a post-processing unit, coupled to the HARQ combination unit; and
    a post-buffer, coupled to the post-processing unit, configured to output the code blocks.

4. The processing circuit of claim 1, wherein each of the sets of data comprises a set of system bit data and a set of parity bit data, and the processing module comprises:

a first processing chain, coupled to the de-shuffler, configured to receive the sets of system bit data from the de-shuffler in the de-shuffled order to recover a plurality of system bit sections;

a second processing chain, coupled to the de-shuffler, configured to receive the sets of parity bit data from the de-shuffler in the de-shuffled order to recover a plurality of parity bit sections; and a concatenation unit, coupled to the first processing chain and the second processing chain, configured to combine each of the system bit sections with a corresponding one of the parity bit sections to form a corresponding one of the code blocks.

5. The processing circuit of claim 4, wherein the first processing chain comprises:

a first pre-processing unit, coupled to the de-shuffler;

a first HARQ combination unit, coupled to the first pre-processing unit; and a first post-processing unit, coupled to the first HARQ combination unit and the concatenation unit, configured to output the system bit sections to the concatenation unit;

and the second processing chain comprises:

a second pre-processing unit, coupled to the de-shuffler;

a second HARQ combination unit, coupled to the second pre-processing unit; and second post-processing unit, coupled to the second HARQ combination unit and the concatenation unit, configured to output the parity bit sections to the concatenation unit.

6. The processing circuit of claim 1, wherein the telecommunications device is a WCDMA telecommunications device.

7. The processing circuit of claim 1, wherein each of the code blocks is an FEC code block.

8. A processing circuit of a telecommunications device, comprising:

a pre-buffer, configured to receive and buffer a plurality of sets of data of a transport block in a shuffled order, wherein the sets of data correspond to a plurality of code blocks, respectively, and each of the sets of data comprises a set of system bit data and a set of parity bit data, the set of system bit data and the set of parity bit data in the transport block being intertwined with another sets of system bit data and parity bit data;

a de-shuffler, coupled to the pre-buffer, configured to retrieve the sets of system bit data from the pre-buffer in a de-shuffled order and retrieve the sets of parity bit data from the pre-buffer in the de-shuffled order, wherein the de-shuffled order is different from the shuffled order;

a first processing chain, coupled to the de-shuffler, configured to receive the sets of system bit data from the de-shuffler in the de-shuffled order to recover a plurality of system bit sections;

a second processing chain, coupled to the de-shuffler, configured to receive the sets of parity bit data from the de-shuffler in the de-shuffled order to recover a plurality of parity bit sections, wherein a set of system bit data and a set of parity bit data in the recovered code blocks are not intertwined with another sets of system bit data and parity bit data; and a concatenation unit, coupled to the first processing chain and the second processing chain, configured to combine each of the system bit sections with a corresponding one of the parity bit sections to form a corresponding one of the code blocks.

9. The processing circuit of claim 8, wherein the first processing chain and the second processing chain are configured to act in a first-in-first-processed manner.

10. The processing circuit of claim 8, wherein the first processing chain comprises:

a first pre-processing unit, coupled to the de-shuffler;

a first HARQ combination unit, coupled to the first pre-processing unit; and a first post-processing unit, coupled to the first HARQ combination unit and the concatenation unit, configured to output the system bit sections to the concatenation unit;

and the second processing chain comprises:

a second pre-processing unit, coupled to the de-shuffler;

a second HARQ combination unit, coupled to the second pre-processing unit; and a second post-processing unit, coupled to the second HARQ combination unit and the concatenation unit, configured to output the parity bit sections to the concatenation unit.

11. The processing circuit of claim 8, wherein the telecommunications device is a WCDMA telecommunications device.

12. The processing circuit of claim 8, wherein each of the code blocks is an FEC code block.

13. A method performed by a telecommunications device, comprising:

receiving and buffering a plurality of sets of data of a transport block in a shuffled order, and each of the sets of data comprises a set of system bit data and a set of parity bit data, the set of system bit data and the set of parity bit data in the transport block being intertwined with another sets of system bit data and parity bit data; and processing the sets of data of the transport block in a de-shuffled order to recover a plurality of code blocks, wherein a set of system bit data and a set of parity bit data in the recovered code blocks are not intertwined with another sets of system bit data and parity bit data;

wherein the de-shuffled order is different from the shuffled order, and the code blocks correspond to the sets of data of the transport block, respectively.

14. The method of claim 13, wherein the step of processing comprises:

pre-processing the sets of data of the transport block in the de-shuffled order; and performing post-processing to recover the code blocks.

15. The method of claim 14, wherein the step of performing post-processing is started before a last one of the sets of data of the transport block has been completely pre-processed.

16. The method of claim 13, further comprising:

decoding the code blocks;

wherein the step of decoding is started before a last one of the sets of data of the transport block has been completely pre-processed.

17. The method of claim 13, wherein the telecommunications device is a WCDMA telecommunications device.

18. The method of claim 13, wherein each of the code blocks is an FEC code block.

* * * * *